United States Patent
Hofstee et al.

(10) Patent No.: US 11,777,748 B2
(45) Date of Patent: Oct. 3, 2023

(54) TRUSTED TIMESTAMPING (71) Applicant: International Business Machines Corporation, Armonk, NY (US)

(72) Inventors: Harm P. Hofstee, Austin, TX (US); Alexander S. J. Misdorp, Amsterdam (NL); Zoltan Szlavik, Hoofddorp (NL)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 16/202,523

(22) Filed: Nov. 28, 2018

(65) Prior Publication Data
US 2020/0169425 A1 May 28, 2020

(51) Int. Cl.
*H04L 9/32* (2006.01)
*H04L 9/08* (2006.01)
*H04L 9/06* (2006.01)
*H04L 9/40* (2022.01)
*H04L 9/00* (2022.01)

(52) U.S. Cl.
CPC .......... *H04L 9/3297* (2013.01); *H04L 9/0637* (2013.01); *H04L 9/0643* (2013.01); *H04L 9/0825* (2013.01); *H04L 9/0861* (2013.01); *H04L 9/0891* (2013.01); *H04L 9/3247* (2013.01); *H04L 63/108* (2013.01); *H04L 9/50* (2022.05)

(58) Field of Classification Search
None
See application file for complete search history.

(56) References Cited

U.S. PATENT DOCUMENTS

| | | |
|---|---|---|
| 5,001,752 A | 3/1991 | Fischer |
| 5,136,646 A | 8/1992 | Haber |
| 6,381,696 B1 | 4/2002 | Doyle |
| 6,965,998 B1 | 11/2005 | Peyravian |
| 7,490,241 B1 | 2/2009 | Peyravian |
| 8,006,094 B2 | 8/2011 | Savitzky |
| 2002/0120851 A1 | 8/2002 | Clarke |
| 2012/0017093 A1 | 1/2012 | Savitzky |
| 2016/0086175 A1* | 3/2016 | Finlow-Bates .... G06Q 20/4015 705/77 |
| 2016/0212146 A1 | 7/2016 | Wilson |
| 2017/0331635 A1 | 11/2017 | Barinov |
| 2018/0165461 A1 | 6/2018 | Unitt |
| 2018/0197007 A1 | 7/2018 | Thirion |
| 2018/0254841 A1* | 9/2018 | Nannra ................. H04L 69/28 |

(Continued)

OTHER PUBLICATIONS

Bralić, V., et al., 2020. A blockchain approach to digital archiving: digital signature certification chain preservation. Records Management Journal, 30(3), pp. 345-362. (Year: 2020).*

(Continued)

*Primary Examiner* — Luu T Pham
*Assistant Examiner* — Edward X Long
(74) *Attorney, Agent, or Firm* — Stephen R. Yoder (57) ABSTRACT

A method, computer program product and computer system for trusted timestamping is provided. A processor generates a first key pair, where the key pair includes a public key and a private key. A processor publishes the public key of the first key pair to an immutable data structure. A processor receives a first digital file for timestamping. A processor signs the first digital file with the private key of the first key pair.

14 Claims, 7 Drawing Sheets

(56) References Cited

U.S. PATENT DOCUMENTS

2018/0337772 A1* 11/2018 Acar .................... H04L 63/123
2020/0076606 A1*  3/2020 Burke ................. H04L 63/0853

OTHER PUBLICATIONS

Malik, S., et al., Nov. 2018, Productchain: Scalable blockchain framework to support provenance in supply chains. In 2018 IEEE 17th International Symposium on Network Computing and Applications (NCA) (pp. 1-10). IEEE. (Year: 2018).*

"NIST Randomness Beacon", NIST, Contact—Rene Peralta, Updated Dec. 6, 2017, Accessed on Sep. 4, 2018 8:56 AM, 3 pages, <https://www.nist.gov/programs-projects/nist-randomness-beacon>.

"OpenTimestamps", OpenTimestamps, Accessed on Aug. 31, 2018 1:40 PM, 3 pages, <https://opentimestamps.org/>.

* cited by examiner

TRUSTED TIMESTAMPING

BACKGROUND OF THE INVENTION

The present invention relates generally to the field of timestamping digital files, and more particularly to blockchains.

A timestamp is information identifying when a certain event occurred. This data is usually stored in a format allowing for easy identification and comparison. Timestamps typically include a date and time of day, sometimes accurate to a small fraction of a second. Many computer files contain timestamps, or associated metadata, that tell when the file was last modified, created or the occurrence of any other event associated with the file.

A blockchain is a list of transactions or entries that are combined into blocks. A cryptographic hash value for each block is determined. Additionally, for a hash value of the preceding block of transactions is also included. This recurring operation of cryptographic hashing of each block creates a data structure that cannot be retroactively altered without changing all of the subsequent blocks in the chain. As such, blockchains are often referred to as immutable or unchangeable, since without an adjustment to each subsequent block in the blockchain, any attempt to a single entry in the block will alter the hash values and fail verification.

SUMMARY

Embodiments of the present invention provide a method, system, and program product for trusted timestamping of digital files. A processor generates a first key pair, where the key pair includes a public key and a private key. A processor publishes the public key of the first key pair to an immutable data structure. A processor receives a first digital file for timestamping. A processor signs the first digital file with the private key of the first key pair.

DETAILED DESCRIPTION

While prior solutions to timestamp verification are known, such prior solutions typically rely upon a central authority to provide authentication of timestamps. Embodiments of the present invention recognize that by utilizing a blockchain network and ledger, improvements to the authenticity and verification of timestamps are provided. By generating public and private keypairs, embodiments of the present invention sign digital files with the private keys and publish the public keys to a blockchain. Signing a file encrypts the file, or a hashed value of the file, providing a later discussed mechanism for verification of the file. Embodiments of the present invention provide improvements to trustworthiness of the timestamping of the signed digital files. By utilizing the immutable nature of a blockchain, embodiments of the present invention increase authenticity and ease of timestamping, since the public keys stored in the blockchain, and used in the verification of the signed files, are accessible by members of the blockchain as well as unchangeable by the members, without full consensus. Furthermore, the published public keys in the blockchain provide additional trust in the authenticity of the public keys based on said consensus by the blockchain members. Additionally, in embodiments where a permissioned blockchain are provided verification and authenticity of timestamping can be provided to members outside the blockchain and to the general public.

Additionally, embodiments of the present invention provide improvements to identifying and authenticating the time used in timestamping based on the ordered structure of the blocks and ledgers of the blockchain. Embodiments of the present invention generate blocks in the blockchain at certain interval units (e.g., every minute). The time for public keys used in timestamping and published to the blockchain during that interval are determined based on the number of blocks from the "genesis" block or originating block. For each intervening block published since the genesis block and the block with a matching public key associated with a signed digital file, embodiments of the present invention determine the time of the timestamp based on the number of blocks and the chosen time interval unit. By utilizing an interval of time associated with each block, embodiments of the present invention provide further authentication improvements to timestamping files.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
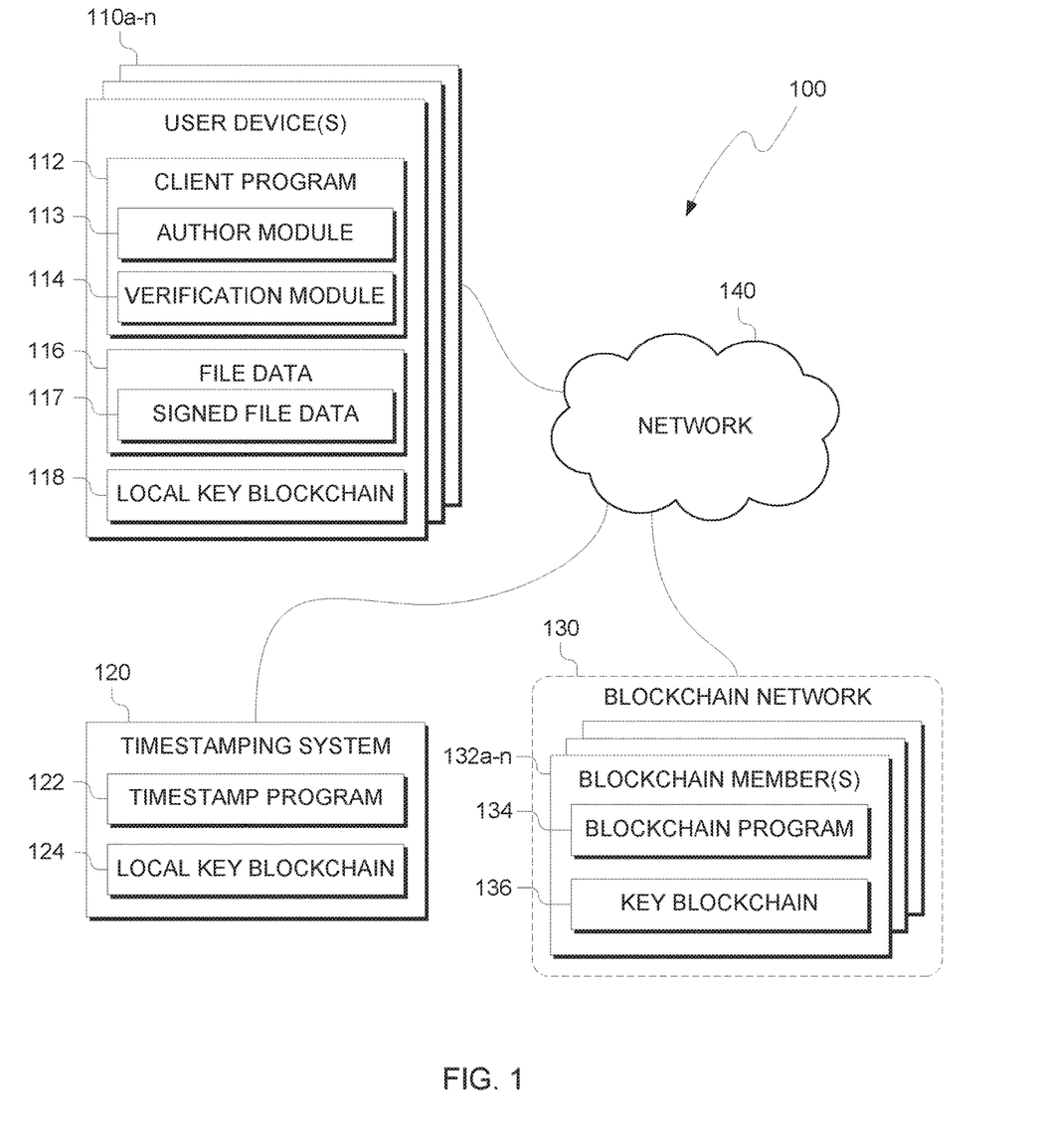
FIG. 1 is a functional block diagram illustrating a networked environment, in accordance with an embodiment of the present invention.

The present invention will now be described in detail with reference to the Figures. FIG. 1 is a functional block diagram illustrating networked environment, generally designated 100, in accordance with one embodiment of the present invention. Networked environment 100 includes user devices 110a-n, timestamping system 120, blockchain network 130 and blockchain members 132a-n connected over network 140. User devices 110a-n includes client program 112, author module 113, verification module 114, file data 116, signed file data 117, and local key blockchain 118. Timestamping system 120 includes timestamp program 122 and local key blockchain 126. Blockchain members 132a-n of blockchain network 130 include blockchain program 134 and key blockchain 136.

In various embodiments of the present invention, user devices 110a-n, timestamping system 120, and blockchain members 132a-n are computing devices that can be a standalone device, a server, a laptop computer, a tablet computer, a netbook computer, a personal computer (PC), or a desktop computer. In another embodiment, user devices 110a-n, timestamping system 120, and blockchain members 132a-n each represent a computing system utilizing clustered computers and components to act as a single pool of seamless resources. In general, user devices 110a-n, timestamping system 120, and blockchain members 132a-n can be any computing device or a combination of devices with access to file data 116, signed file data 117, local key blockchain 118, local key blockchain 126, and key blockchain 136 and is capable of executing client program 112, author module 113, verification module 114, timestamp program 122, and blockchain program 134. User devices 110a-n, timestamping system 120, and blockchain members 132*a-n* may each include internal and external hardware components, as depicted and described in further detail with respect to FIG. 7.

In this exemplary embodiment, client program 112, author module 113, verification module 114, file data 116, signed file data 117, and local key blockchain 118 are stored on user devices 110*a-n*; timestamp program 122 and local key blockchain 126 are stored on timestamping system 120; and blockchain program 134 and key blockchain 136 are stored on blockchain members 132*a-n*. However, in other embodiments, client program 112, author module 113, verification module 114, file data 116, signed file data 117, local key blockchain 118, timestamp program 122, local key blockchain 126, blockchain program 134 and key blockchain 136 may be stored externally and accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between user devices 110*a-n*, timestamping system 120, blockchain network 130 and blockchain members 132*a-n*, in accordance with a desired embodiment of the present invention.

In various embodiments, user devices 110*a-n* each include a respective client program 112. Client program 112 includes author module 113 and verification module 114. Client program 112 provides a user interface to a user to select a file in file data 116 for timestamping by timestamping system 120. In some embodiments, file data 116 includes various files stored to the respective user device of user devices 110*a-n*. In some embodiments, file data 116 includes various files stored on other devices (not shown) connected to network 140. One of ordinary skill in the art will appreciate that file data 116 may be stored on any device connected to network 140 without deviating from the present invention. Additionally, one of ordinary skill in the art will appreciate that the files in file data 116 may be of any format or structure without deviating from the present invention. Furthermore, while the forgoing disclosure will discuss the operation of timestamping a file from file data 116, one of ordinary skill in the art will appreciate the file or data structure to be time stamped may include multiple files or components, such as an archive or project, without deviating from the present invention.

In various embodiments, client program 112 provides a user interface to a user to select a file in file data 116 for timestamping by timestamping system 120. In some embodiments, all of the functions of client program 112, as discussed herein, are provided by and executed on the respective user device of user devices 110*a-n* (e.g., such as dedicated application or executable). In other embodiments, client program 112 provides one or more functions on another device connected to network 140. For example, client program 112 provides a user interface through a web browser. In this example, timestamping system 120 provides one or more functions assorted and discussed in reaction to client program 112 via a web application server (not shown).

In various embodiments, client program 112 provides a user interface to a user to select a file in file data 116 for timestamping by timestamp program 122 of timestamping system 120. Author module 113 retrieves the selected file and sends the file to timestamp program 122. As will be discussed in detail herein, timestamp program 122 signs the file with a private key, using an asymmetric cryptography system that generates a public and private keypair. For example, timestamp program 122 implements an asymmetric cryptography system such as Rivest-Shamir-Adleman (RSA) or ElGamal. One of ordinary skill in the art will appreciate that any asymmetric cryptography system may be utilized without deviating from the invention. Furthermore, one of ordinary skill in the art will appreciate that any key size may be utilized without deviating from the invention.

In various embodiments, timestamp program 122 sends the signed file to author module 113 of client program 112. In response, author module 113 stores the signed file in signed file data 117 of file data 116. In some embodiments, author module 113 edits or overwrites the original file in file data 116 with the signed file received from timestamping system 120.

In some embodiments and scenarios, author module 113 generates a hash value of the file selected for timestamping. A hash value is a value that is unique for a certain input. For example, the various bit values in the selected file generate a unique hash value for each different file. In such embodiments and scenarios, author module 113 sends the hash value of the selected file to timestamp program 122. Timestamp program 122 signs the hash value with the private key of the keypair data, returning the signed hash value of the file to author module 113. In some scenarios, author module 113 updates a header portion of the selected file with the signed hash value received from timestamp program 122. In other scenarios, author module 113 separately stores the signed hash value in signed file data 117 along with an association to the selected file in file data 116.

In various embodiments, timestamp program 122 publishes the public key of the keypair to key blockchain 136 of blockchain network 130. Blockchain network 130 includes various blockchain members 132*a-n*. Key blockchain 136 is a data structure that is shared among blockchain members 132*a-n*. Key blockchain 136 includes blocks each with an ordered list of public keys published by timestamp program 122 during a given interval. Each blockchain member of blockchain members 132*a-n* includes an instance of blockchain program 134. When a request to publish a public key is received, each instance of blockchain program 134 of the blockchain members 132*a-n* process the request to publish the public key to key blockchain 136. Once a majority of the blockchain programs of the blockchain members 132*a-n* reach a consensus, then the public key is added to key blockchain 136. For example, consensus is reached based on a consensus protocol such as the Practical Byzantine Fault Tolerance (PBFT) consensus model. In another example, consensus is determined based on computing or computational power of blockchain network 130. One of ordinary skill in the art will appreciate that any methodology or model for determining consensus among blockchain members 132*a-n* may be used without deviating from the invention. In some embodiments, timestamp program 122 includes a hash value of the file in the publish request to key blockchain 136 of blockchain network 130.

In some embodiments or scenarios, a blockchain program 134 that reached consensus among blockchain members 132*a-n* for entering the public key in key blockchain 136 sends a block number, signed file identification number or other information indicative of where in the key blockchain 136 the published public key resides to timestamp program 122. In further scenarios and embodiments, a blockchain program 134 that reached consensus generates a hash value based on the information indicative of where in the key blockchain 136 the published public key resides to timestamp program 122. In such embodiments and scenarios, timestamp program 122 provides the information indicative of where in the key blockchain 136 the published public key resides to author module 113. In some scenarios, author module 113 stores the information in a header of the private key signed file. In other scenarios, author module 113 stores the information in another location and associates the information with the location of the private key signed file.

In various embodiments, timestamp program 122 generates a new keypair for a given period, or interval, of time. For example, timestamp program 122 generates a new keypair every minute or every ten minutes. One of ordinary skill in the art will appreciate that any key interval may be used without deviating from the invention. For every interval, timestamp program 122 publishes the public key of the keypair to key blockchain 136 of blockchain network 130. During this interval, any request to timestamp a file received by timestamp program 122 is signed with the private key of the keypair. Once the interval has completed, timestamp program 122 generates a new keypair for the following interval of time. In some embodiments and scenarios, timestamp program 122 deletes the private key to ensure that the private key is not used again in any subsequent intervals.

In various embodiments and scenarios, blockchain network 130 stores the published public keys in an ordered list stored in a block of key blockchain 136. As one of ordinary skill in the art will appreciate, blockchains possess many important qualities. For each item or transaction added to key blockchain 136, blockchain programs 134 that reached consensus among blockchain members 132a-n solve or generate cryptographic hash values that not only satisfy the current entry's information, but also the previous entries or blocks of key blockchain 136. Any attempt to change the entries would result in different hash values which would cascade or further alter any subsequent entries. As such, blockchains possess a property referred to as immutability, an ability that does not allow changes to consensus entries made by the blockchain members. In various embodiments, key blockchain 136 provides the immutability property to ensure that the public keys are trusted and unalterable.

One of ordinary skill in the art will further appreciate another property of blockchains as used in key blockchain 136, that blockchains comprise an order list of entries. Each request to publish an entry in a blockchain is added sequentially to the blockchain. As discussed above with immutability, only a consensus of the blockchain members 132a-n can alter the blockchain. As such, the order of entries also provides and unalterable progression.

In various embodiments and scenarios, based on the unalterable order of key blockchain 136, a program with access to key blockchain 136 can determine the time that the entry was entered based on the various features discussed regarding blockchain and the interval keypair generated by timestamp program 122. Since blockchains are an order list of entries of messages, transactions, or other information a change or procession in time can be inferred for later entries in key blockchain 136. Additionally, since key blockchain 136 includes a series of public keys published at set intervals, the publication time of each entry in key blockchain 136 can also be inferred. For example, blockchains include a starting block referred to as a genesis block. Additionally, in this example timestamp program 122 publishes a public key to key blockchain 136 every ten minutes. Therefore, a public key that is five blocks or entries away from the genesis block can be determined to have a timestamp value of the time of the genesis blocks publication plus fifty minutes. As such, sixty minutes from the creation of the key blockchain 136 provides both a determination and verification of the timestamp of signed files that match the public key in the fifth block. In some embodiments and scenarios, entries in each block of key blockchain 136 include the number of blocks or entries from the genesis block.

In some embodiments, the genesis block of key blockchain 136 is an empty block. Once the first interval has begun, timestamping program 122 publishes one or more public keys to a second block in key blockchain 136, (e.g., the second block contains all public keys published between 00:00 and 00:10 for a ten-minute interval). In other embodiments, the genesis block of key blockchain 136 includes one or more public keys that are published during a first interval (e.g., 00:00 and 00:10) and the second block includes keys published during a second interval (e.g., 00:10 and 00:20).

In some embodiments and scenarios, a computing system can quickly generate keypair values when compared to a blockchain network creating new blocks. As such, key blockchain 136 may include multiple key entries per block. In such scenarios, since each public key is published at set intervals, the number of entries preceding a public key as well as the number of blocks, and the amount of entries for each block, from the genesis block are determined. Based on the preceding number of entries from the genesis block, a timestamp for digitally signed files associated with the published public key is determined. One of ordinary skill in the art will appreciate that any time interval and block size may be used without deviating from the invention. One of ordinary skill in the art would appreciate that selection of intervals and block size may be based on predicted timestamping request values received from user devices 110a-n and processing power of the timestamping system 120 and blockchain network 130.

As one of ordinary skill in the art will appreciate, the trusted timestamping of files is achieved based both on the immutability of key blockchain 136 as well as the unalterable and periodic order of public keys to key blockchain 136. When blockchain members 132a-n reach consensus in publishing a public key, the public key is trusted and cannot be changed, serving as a mechanism for trusted verification of signed files with private keys during the same interval. Signed files in signed file data 117 can be provided a trusted time stamp value that is verifiable based on key blockchain 136. Based on the location in the blockchain of a published public key in key blockchain 136, signed files that are decryptable by the public key can be assigned timestamps within the interval from the numbers of entries or blocks from the genesis block.

In various embodiments, author module 113 receives a signed file digitally signed with the private key for the current interval of time when received by timestamp program 122. In some embodiments, timestamp program 122 sends a signed file identification number, block number, hash values or other information indicating where the public key of the current interval is located key blockchain 136.

In various embodiments, other user devices of user devices 110a-n receive the signed file. For example, a user may share a signed file with another user. In some scenarios, the recipient user requests a timestamp value for the signed file. In other scenarios, the signed file includes metadata that includes a timestamp and the recipient request verification of the timestamp provided in the signed file. In various embodiments, verification module 114 for the user device requesting verification or timestamp value provides the requested information.

In some embodiments, verification module 114 queries one or more a blockchain program 134 of blockchain network 130 to identify or verify the timestamp of the signed file. In some scenarios, blockchain program 134 decrypts the signed file with one or more public keys in key blockchain 136. When blockchain program 134 identifies a public key that decrypts the signed file, blockchain program 134 determines the numbers of entries or blocks from the genesis block to the matching public key. Based on the keypair interval time utilized, blockchain program 134 determines the timestamp value of the signed file. For verification scenarios, verification module 114 includes the provided timestamp of the signed file. Blockchain program 134 compares the value provided by the verification module 114 with the determined timestamp value based on both interval time and the number of block or entries from the genesis block. If the provided timestamp is within the interval associated with the decrypting public key, then blockchain program 134 verifies that the timestamp is trusted and correct. If the timestamp is outside the determined time interval for the public key, then blockchain program 134 sends a message to verification module 114 that the timestamp is untrusted and incorrect. For other scenarios where a timestamp value is requested, blockchain program 134 sends the timestamp value for the determined interval associated with the decrypting public key.

In some embodiments and scenarios, verification of timestamps is performed by either timestamp program 122, verification module 114 or other devices and program (not shown) with access to key blockchain 136. In such embodiments, a local copy of key blockchain 136 is retrieved and stored (i.e., local key blockchain 118 and 124). In some scenarios, a full and complete copy of key blockchain 136 is mirrored to the local copies of key blockchain 136. In other scenarios, a partial copy, such as the latest set of blocks in key blockchain 136, are mirrored to the local copies of key blockchain 136. As such, verification with local copies are provided utilizing the features discussed herein in identifying and verifying timestamps of signed files.

In some embodiments, timestamping system 120 is a member of blockchain network 130 and provides consensus to public key publications to key blockchain 136. In such embodiments, timestamping system 120 includes instances of blockchain program 134 as well as a full copy of key blockchain 136. In some embodiments, one or more blockchain members 132a-n provides timestamping features and interval keypair generation. In such embodiments, blockchain program 134 an instance of timestamp program 122. Additionally, synchronization of keypair generation and interval timing between multiple instances of timestamp program 122 are provided to ensure all files signed during the current interval share the same keypair.

In some embodiments and scenarios, blockchain network 130 provides a permission key blockchain 136. Permissioned blockchains only accept publication requests from trusted blockchain members 132a-n or nodes. Such embodiments prevent malicious parties from gaining consensus from the blockchain network 130 to alter publications to key blockchain 136.

In some embodiments and scenarios, timestamping system 120 is integrated into a satellite system or network. In such embodiments, timestamping system 120 will provide more secure generation and publication of keypairs and prevent tampering due to the closed network of the satellite system. Additionally, satellite systems typically include atomic clocks and would provide for more accurate timestamping.

Figure 2:
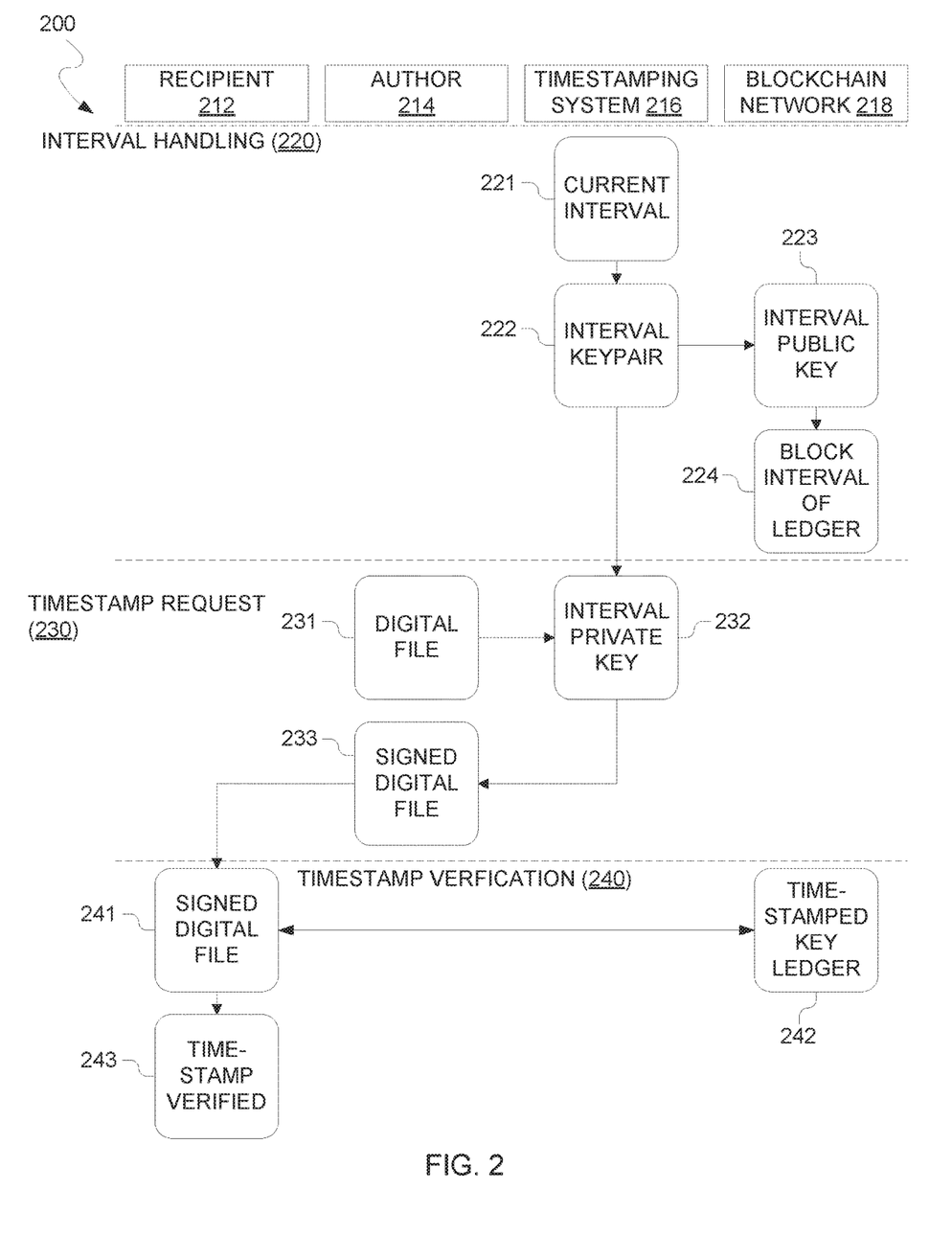
FIG. 2 depicts a block diagram illustrating the operations to provide timestamping and verification of a digital file, in accordance with an embodiment of the present invention.

FIG. 2 depicts a block diagram 200 illustrating the operations to provide timestamping and verification of a digital file, in accordance with an embodiment of the present invention. Block diagram 200 depicts four entities separated into columns including recipient 212, author 214, timestamping system 216 and blockchain network 218. Block diagram 200 depicts the flow of data structures with three operations separated into rows including timestamp interval 220, timestamp request 230, and timestamp verification 240. An overall flow between entities and data structures are depicted as a non-limiting example to illustrate the features discussed herein. During the example flow depicted in block diagram 200, changes in current intervals and related keypairs may occur when implemented.

During operation, timestamping system 216 constantly monitors current interval 221 for interval handling 220. Based on the current time and interval size, timestamping system 216 determines if a current interval has expired. At the start of each interval, timestamping system 216 generates interval keypair 222. As discussed herein, interval keypair 222 is based on an asymmetric encryption standard and includes interval public key 223 and interval private key 232. Timestamping system 216 publishes interval public key 223 to blockchain network 218. Blockchain network 218 adds interval public key 223 to a block interval of ledger 224 (e.g., a block of key blockchain in 136). In some embodiments, block interval of ledger 224 includes multiple sequential entries of public keys per block. In some embodiments, blockchain network 218 provides a public key address (not shown) to timestamping system 216 once the interval public key 223 is published.

During timestamp handling for current interval 221, blockchain network 218 may receive one or more timestamp request(s) 230 from author 214. In some embodiments, author 214 provides digital file 231 to timestamping system 216. In other embodiments, author 214 provides a hash value of digital file 231 to timestamping system 216. For the current interval, timestamping system 216 signs digital file 231, or in some cases the hash value of digital file 231, with the interval private key 232 of the current interval 221. Timestamping system 216 sends the signed digital file 233 to author 214. In some embodiments, Timestamping system 216 sends the public key address (not shown) for the interval public key 223 of the current interval 221 as stored in and accessible from blockchain network 218. In some scenarios, timestamping system 216 may receive multiple timestamp requests 230 for the same current interval 221. Each request includes a different digital file 231 but is signed by timestamping system 216 with the same interval private key 232. In some embodiments, one or more members of blockchain network 218 send the public key address to user devices 110a-n. In some embodiments, either timestamping system 216 or blockchain network 218 sends or include in the signed digital file 231 an interval or block number, used by for locating the public key in key blockchain 136.

When the current interval expires, timestamping system 216 performs interval handling 220 again. Timestamping system 216 generates a new interval keypair 222. Timestamping system 216 publishes the new interval public key 223 to blockchain network 218. Blockchain network 218 reaches consensus to the new interval public key 223 and publishes the key to the current block interval of ledger 224. In some scenarios, the blockchain adds a new entry to block interval of ledger 224 or creates a new block for block interval of ledger 224 based on the current block size prior to adding the new interval public key 223. When adding the new interval public key 223 blockchain network reaches consensus on a hash value for the current entry of the new interval public key 223 that also includes the previous block's (i.e., the previous interval public key 223) hash value. During this new interval, any digital files 231 received as timestamp requests 230 are signed using the new interval private key 232. In some embodiments, more than one public key is published to the same block interval of ledger 224.

Timestamp verification 240 occurs when a recipient of the signed digital file 233 proceeds to verify the timestamping of a received signed digital file 241. In some scenarios, recipient 212 provides the signed digital file 241 to blockchain network 218 for searching of timestamped key ledger 242 (e.g., key blockchain 136) which contains all immutable and sequential publication of public keys at previous intervals to blockchain network 218. In some embodiments, recipient 212 identifies the matching public key in timestamped key ledger 242 associated with the received signed digital file 241. In other embodiments, blockchain network 218 identifies the matching public key associated with the received signed digital file 241. Based on the amount of entries and blocks from the genesis block of the timestamped key ledger 242, blockchain network 218 verifies the timestamp of the received signed digital file 241. In other embodiments, a public key address is provided to recipient 212 either as part of received signed digital file 241 or in a separate message. In such a scenario, recipient 212 sends the public key address to blockchain network 218 to identify the location of the public key. Upon a successful decryption of the received signed digital file 241, blockchain network 218 determines or verifies the timestamp of the received signed digital file 241 based on the amount of entries or blocks from the genesis block of timestamped key ledger 242. In some embodiments, blockchain network provides a full or partial copy of timestamped key ledger 242 for verification and determination of the timestamp for the received signed digital file 241.

Figure 3:
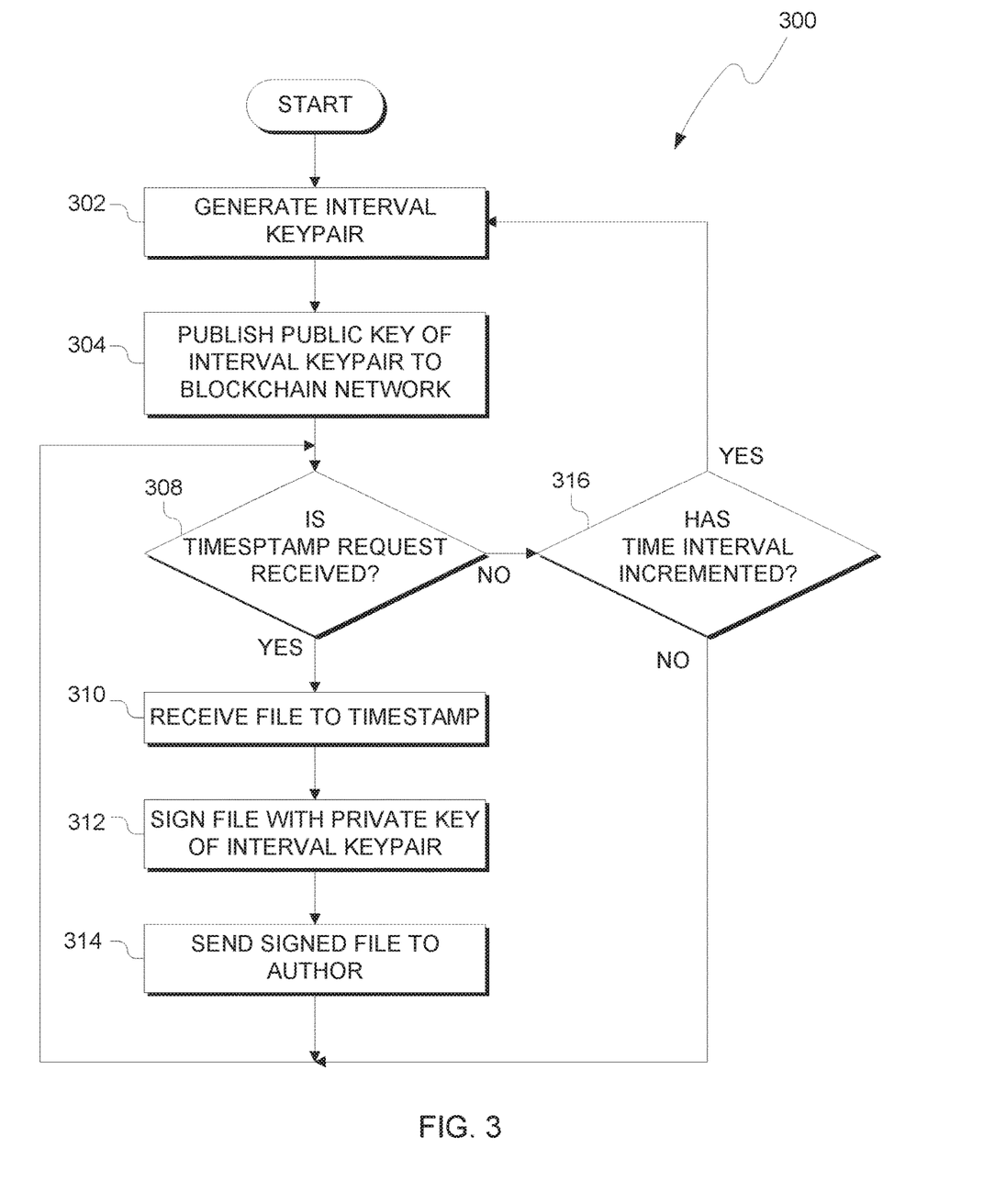
FIG. 3 illustrates operational processes of a timestamping system within the networked environment of FIG. 1, in accordance with an embodiment of the present invention.

FIG. 3 illustrates operational processes of timestamping program 122, generally designated 300, within networked environment 100 of FIG. 1, in accordance with an embodiment of the present invention. In process 302, timestamping program 122 generates a keypair for the current interval. Timestamping program 122 generates an asymmetric encryption keypair comprising a public and private key. In process 304, timestamping program 122 publishes the public key of the interval keypair to the blockchain network.

Figure 4:
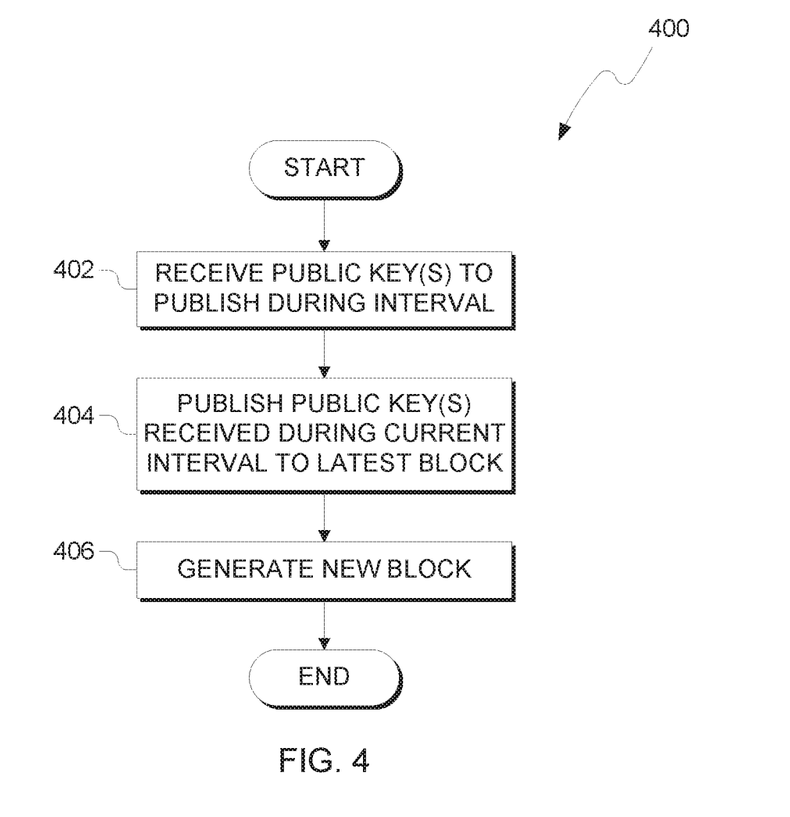
FIG. 4 illustrates operational processes of a blockchain network within the networked environment of FIG. 1, in accordance with an embodiment of the present invention.

FIG. 4 illustrates operational processes, generally designated 400, of blockchain program 134 for each of the blockchain members 132a-n within the networked environment of FIG. 1, in accordance with an embodiment of the present invention. In process 402, blockchain program 134 receives public key for publishing to the blockchain network. In various embodiments, each blockchain program 134 for blockchain members 132a-n receives the public key. In process 406, each blockchain program 134 for blockchain members 132a-n determines a hash value for the current public key that includes the previous block's hash value in the key blockchain 136. Once a consensus of the blockchain members 132a-n agreed on the hash value for the new public key, then the key is published to key blockchain 136 (process 404). In some embodiments and scenarios, a blockchain program 134 of the blockchain members 132a-n sends a public key address or other information indicative of the location in key blockchain 136 that the public key is published to timestamping program 122. In some embodiments or scenarios, based on the current block size of the key blockchain 136, one or more blockchain programs 134 of the blockchain members 132a-n may generate a new block in key blockchain 136.

Referring back to FIG. 3, once the public key is published in key blockchain 136, timestamping program 122 determines if any requests to timestamp a file are received (decision process 308). If no requests are received (NO Branch of process 308), then timestamping program 122 determines if the current interval has incremented or passed. During the operation of 400, timestamping program 122 continuously checks to identify when a current interval has expired (decision process 316). If the interval has expired (YES branch of process 316), then timestamping program 122 generates a new keypair for the new interval (process 302). If the interval has not changed (NO branch of process 316), then timestamping program 122 checks if any timestamp requests have been received (decision process 308).

If a timestamp request has been received (YES branch of process 308), then timestamping program 122 receives the file from the author requesting a timestamp operation (process 310). In process 312, timestamping program 122 signs the received file in process 310 with the private key for the current interval. In some embodiments, timestamping program 122 receives a hash value of the file to be timestamped instead (e.g., process 310 includes only a hash value of the file). In such embodiments, timestamping program 122 signs the hash value of the file with the private key for the current interval in process 312 instead.

In process 314, timestamping program 122 sends the signed file to the author. In some embodiments, timestamping program 122 sends the public key address for the current interval as provided in some embodiments of process 304 by blockchain network 130. In various embodiments, timestamping program 122 continues processes 308-314 for any files or hash values received during the current interval. Once enough time has passed and the interval has incremented (YES branch of process 316), timestamping program 122 generates a new keypair, publishes the new public key to key blockchain 136 (process 304), and signs any files or hash values with the new private key during the subsequent interval (processes 308-314).

Figure 5:
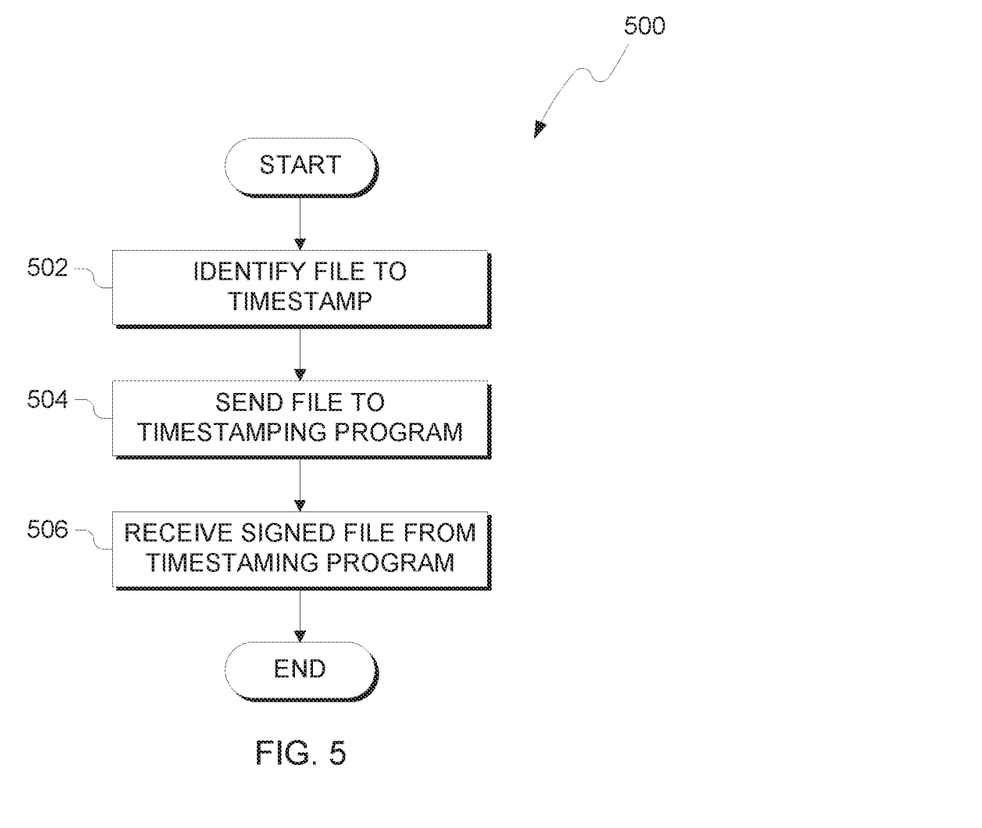
FIG. 5 illustrates operational processes of a client device authoring a file for timestamping within the networked environment of FIG. 1, in accordance with an embodiment of the present invention.

FIG. 5 illustrates operational processes, generally designated 500, of author module 113 of a user device in user devices 110a-n within the networked environment of FIG. 1, in accordance with an embodiment of the present invention. In process 502, author module 113 identifies a file in file data 116 to timestamp. In some embodiments, a user of client program 112 provides input indicating a selection of a file in file data 116 to timestamp. In other embodiments, author module 113 scans files in file data 116 and automatically chooses files to timestamping. In other embodiments, author module 113 generates a hash value of the file for transmittal (process 504). In process 504, author module 113 sends the identified file to timestamping program 122. Referring back to FIG. 3, timestamping program 122 signs the file with the current interval's private key (processes 308-314). In process 506, author module 113 receives the signed file from timestamping program 122. In some embodiments, author module 113 stores the signed file in signed file data 117. In other embodiments, author module 113 overwrites or changes the original file in file data 116 with the signed file.

Figure 6:
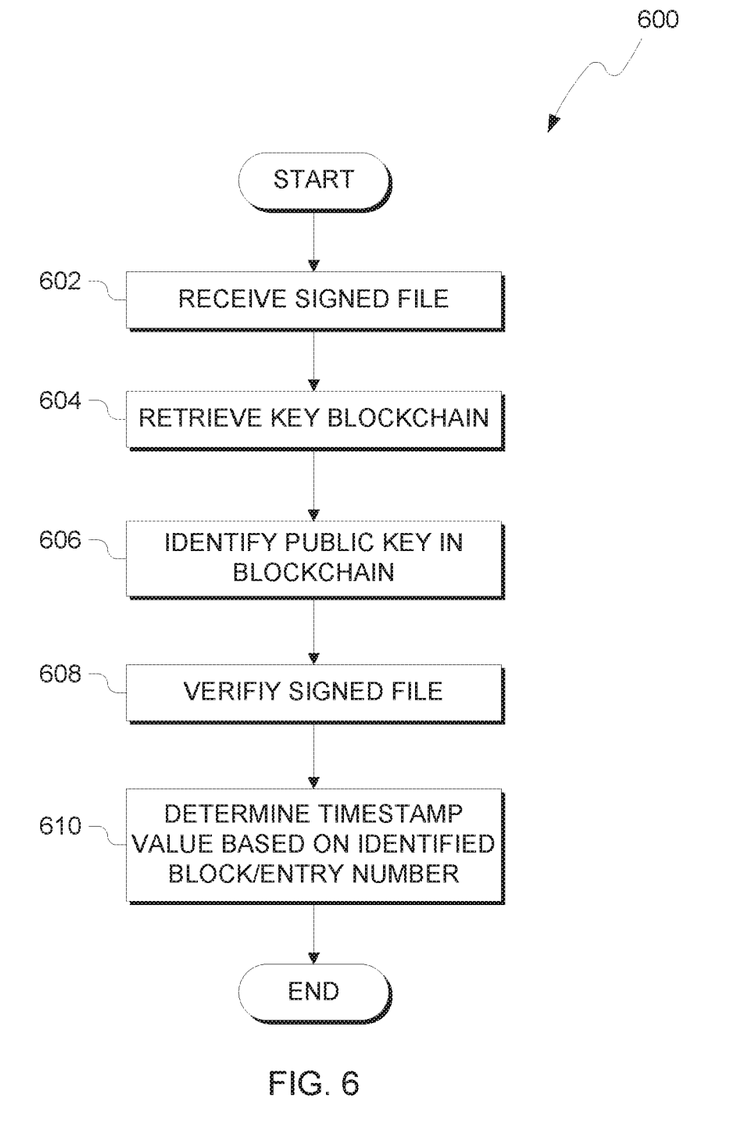
FIG. 6 illustrates operational processes of a client device verifying a timestamp of file within the networked environment of FIG. 1, in accordance with an embodiment of the present invention.

FIG. 6 illustrates operational processes, generally designated 600, of verification module 114 of a user device in user devices 110a-n within the networked environment of FIG. 1, in accordance with an embodiment of the present invention. In process 602, verification module 114 receives one or more file for timestamp verification. In some embodiments, verification module 114 retrieves key blockchain 136 (process 604) from a stored copy in local key blockchain 118. In process 606, verification module 114 identifies the public key in key blockchain 136 associated with the signed file received in process 602. In some embodiments, verification module 114 searches the entries and blocks of key blockchain 136 for a matching public key. In other embodiments, verification module 114 is provided a public key address or other indicative information such as a block number or transactional hash values of key blockchain 136. Based on the provided public key address or indicative information of the location of the public key in key blockchain 136, verification module 114 identifies the public key.

In process 608, verification module 114 verifies the signed file by decrypting the file with the identified public key. If decryption is successful, then verification module 114 proceeds with determining the files timestamp (process 610). If decryption is unsuccessful, then verification module 114 determines that the signed file is fraudulent. In process 610, verification module 114 determines the timestamp value for the signed file. Based on the number of blocks and entries from the location in key blockchain 136, verification module 114 determines a number of intervals between when the public key was published and the creation of the genesis block of key blockchain 136 occurred. Then, based on the interval time amount, verification module 114 multiplies the interval with the interval time amount to determine how much time has elapsed since the genesis blocks creation. From the time the genesis blocks creation, verification module 114 adds the elapsed time to determine a timestamp for the signed filed received in process 602.

In the foregoing discussion of processes 600, verification module was depicted as being included in client program 112 of user devices 110a-n. One of ordinary skill in the art will appreciate that verification module 114 may provide the features discussed herein with regards to any device with access to key blockchain 136 or a copy thereof such as local key blockchains 118 and 126. For example, verification module 114 may be provided by either timestamping system 120 or one or more members of blockchain network 130.

Figure 7:
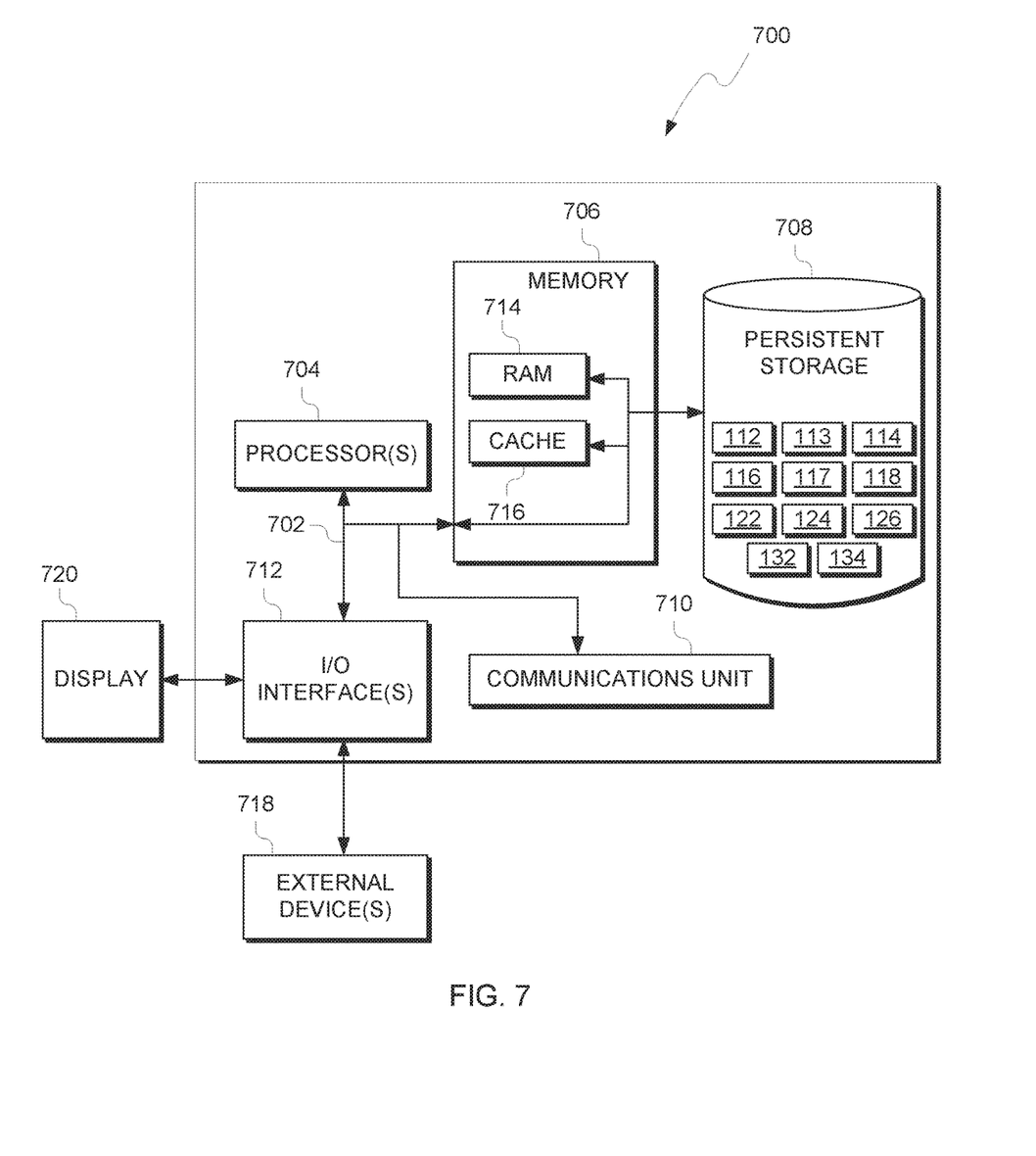
FIG. 7 depicts a block diagram of components of the computing device executing various programs and modules, in accordance with an exemplary embodiment of the present invention.

FIG. 7. depicts a block diagram, 700, of components of user devices 110a-n, timestamping system 120, and blockchain members 132a-n, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

User devices 110a-n, timestamping system 120, and blockchain members 132a-n each include communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Client program 112, author module 113, verification module 114, file data 116, signed file data 117, local key blockchain 118, timestamp program 122, local key blockchain 124, blockchain program 134 and key blockchain 136 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of network 140. In these examples, communications unit 710 includes one or more network interface cards. Communications unit 710 may provide communications through the use of either or both physical and wireless communications links. Client program 112, author module 113, verification module 114, file data 116, signed file data 117, local key blockchain 118, timestamp program 122, local key blockchain 126, blockchain program 134 and key blockchain 136 may be downloaded to persistent storage 708 through communications unit 710.

I/O interface(s) 712 allows for input and output of data with other devices that may be connected to user devices 110a-n, timestamping system 120, and blockchain members 132a-n. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., client program 112, author module 113, verification module 114, file data 116, signed file data 117, local key blockchain 118, timestamp program 122, local key blockchain 126, blockchain program 134 and key blockchain 136, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method comprising:
generating, by one or more processors, a first key pair, wherein the key pair includes a public key and a private key;

publishing, by the one or more processors, the public key of the first key pair to an immutable data structure, wherein the public key is published during a periodic time interval and the publication of the public key includes a sequence location within the immutable data structure that corresponds to the periodic time interval;

receiving, by the one or more processors, a first digital file for timestamping;

signing, by the one or more processors, the first digital file with the private key of the first key pair;

identifying, by the one or more processors, the sequence location of the public key of the first key pair published to the immutable data structure;

retrieving, by the one or more processors, a timestamp value of the first digital file; and verifying, by the one or more processors, the timestamp value based on a comparison of the timestamp value and the number of entries from an initial entry in the immutable data structure to the sequence location of the public key of the first key pair published to the immutable data structure;

wherein the private key of the first key pair is removed from additional use after a pre-determined amount of time has elapsed after generating the first key pair.

2. The method of claim 1, the method further comprising:

generating, by the one or more processors, a second key pair based, at least in part, on a pre-determined amount of time after the generation of the first key pair elapsing, wherein (i) the second key pair includes a second public key and a second private key and (ii) the second key pair is different than the first keypair;

publishing, by the one or more processors, the public key of the second key pair to an immutable data structure, wherein the public key of the second key pair is stored sequentially in relation to the public key of the first key pair;

receiving, by the one or more processors, a second digital file for timestamping after the pre-determined amount of time after the generation of the first key pair elapsing; and signing, by the one or more processors, the second digital file with the private key of the second key pair.

3. The method of claim 1, wherein identifying the sequence location of the public key of the first key pair published to the immutable data structure is based on an address value generated when publishing the public key of the first key pair to the immutable data structure.

4. The method of claim 1, wherein the first digital file is based on a hash function of a file to be timestamped.

5. The method of claim 1, wherein publishing the public key of the first key pair to the immutable data structure is a permissioned action.

6. A computer program product comprising:

one or more computer-readable storage media and program instructions stored on the one or more computer-readable storage media, the program instructions comprising:

program instructions to generate a first key pair, wherein the key pair includes a public key and a private key;

program instructions to publish the public key of the first key pair to an immutable data structure, wherein the public key is published during a periodic time interval and the publication of the public key includes a sequence location within the immutable data structure that corresponds to the periodic time interval;

program instructions to receive a first digital file for timestamping;

program instructions to sign the first digital file with the private key of the first key pair;

program instructions to identify the sequence location of the public key of the first key pair published to the immutable data structure;

program instructions to retrieve a timestamp value of the first digital file; and program instructions to verify the timestamp value based on a comparison of the timestamp value and the number of entries from an initial entry in the immutable data structure to the sequence location of the public key of the first key pair published to the immutable data structure;

wherein the private key of the first key pair is removed from additional use after a pre-determined amount of time has elapsed after generating the first key pair.

7. The computer program product of claim 6, the method further comprising:

program instructions to generate a second key pair based, at least in part, on a pre-determined amount of time after the generation of the first key pair elapsing, wherein (i) the second key pair includes a second public key and a second private key and (ii) the second key pair is different than the first keypair;

program instructions to publish the public key of the second key pair to an immutable data structure, wherein the public key of the second key pair is stored sequentially in relation to the public key of the first key pair;

program instructions to receive a second digital file for timestamping after the pre-determined amount of time after the generation of the first key pair elapsing; and program instructions to sign the second digital file with the private key of the second key pair.

8. The computer program product of claim 6, wherein program instructions to identify the sequence location of the public key of the first key pair published to the immutable data structure is based on an address value generated when publishing the public key of the first key pair to the immutable data structure.

9. The computer program product of claim 6, wherein the first digital file is based on a hash function of a file to be timestamped.

10. The computer program product of claim 6, wherein program instructions to publish the public key of the first key pair to the immutable data structure is a permissioned action.

11. A computer system comprising:

one or more computer processors;

one or more computer readable storage media; and program instructions stored on the computer readable storage media for execution by at least one of the one or more processors, the program instructions comprising:

program instructions to generate a first key pair, wherein the key pair includes a public key and a private key program instructions to publish the public key of the first key pair to an immutable data structure, wherein the public key is published during a periodic time interval and the publication of the public key includes a sequence location within the immutable data structure that corresponds to the periodic time interval;

program instructions to receive a first digital file for timestamping;

program instructions to sign the first digital file with the private key of the first key pair;

program instructions to identify the sequence location of the public key of the first key pair published to the immutable data structure;

program instructions to retrieve a timestamp value of the first digital file; and program instructions to verify the timestamp value based on a comparison of the timestamp value and the number of entries from an initial entry in the immutable data structure to the sequence location of the public key of the first key pair published to the immutable data structure;

wherein the private key of the first key pair is removed from additional use after a pre-determined amount of time has elapsed after generating the first key pair.

12. The computer system of claim 11, the method further comprising:

program instructions to generate a second key pair based, at least in part, on a pre-determined amount of time after the generation of the first key pair elapsing, wherein (i) the second key pair includes a second public key and a second private key and (ii) the second key pair is different than the first keypair;

program instructions to publish the public key of the second key pair to an immutable data structure, wherein the public key of the second key pair is stored sequentially in relation to the public key of the first key pair;

program instructions to receive a second digital file for timestamping after the pre-determined amount of time after the generation of the first key pair elapsing; and program instructions to sign the second digital file with the private key of the second key pair.

13. The computer system of claim 11, wherein program instructions to identify the sequence location of the public key of the first key pair published to the immutable data structure is based on an address value generated when publishing the public key of the first key pair to the immutable data structure.

14. The computer system of claim 11, wherein the first digital file is based on a hash function of a file to be timestamped.

* * * * *